United States Patent
Raap et al.

(10) Patent No.: US 12,461,127 B2
(45) Date of Patent: Nov. 4, 2025

(54) NON-CONTACT DC CURRENT MEASUREMENT DEVICE WITH OPEN LOOP DEGAUSSING

(71) Applicant: Fluke Corporation, Everett, WA (US)

(72) Inventors: Bryanna D. Raap, Everett, WA (US); Matt Moran, Everett, WA (US); Nicholas W. Dinsmore, Everett, WA (US); Joshua Zoellick, Mukilteo, WA (US); Paul A. Ringsrud, Langley, WA (US)

(73) Assignee: Fluke Corporation, Everett, WA (US)

( * ) Notice: Subject to any disclaimer, the term of this patent is extended or adjusted under 35 U.S.C. 154(b) by 230 days.

(21) Appl. No.: 18/301,079

(22) Filed: Apr. 14, 2023

(65) Prior Publication Data
US 2024/0345137 A1    Oct. 17, 2024

(51) Int. Cl.
| | | |
|---|---|---|
| *G01R 15/18* | (2006.01) | |
| *G01R 15/00* | (2006.01) | |
| *G01R 19/00* | (2006.01) | |

(52) U.S. Cl.
CPC ......... *G01R 15/181* (2013.01); *G01R 15/005* (2013.01); *G01R 19/0092* (2013.01)

(58) Field of Classification Search
CPC ............ G01R 15/181; G01R 15/005; G01R 19/0092; G01R 15/202; G01R 15/207; G01R 15/185; G01R 15/18
(Continued)

(56) References Cited

U.S. PATENT DOCUMENTS 3,972,304 A * 8/1976 Boucher ............. D07B 7/145
57/296
5,012,218 A    4/1991 Haug et al.
(Continued)

FOREIGN PATENT DOCUMENTS

| CN | 111999541 A | 11/2020 |
|---|---|---|
| DE | 10 2014 216 404 B4 | 9/2021 |

(Continued)

OTHER PUBLICATIONS

Power Electronic Measurements Ltd. "DCflex Specification" Mar. 2018, 2 pages.
(Continued)

*Primary Examiner* — Giovanni Astacio-Oquendo
(74) *Attorney, Agent, or Firm* — Seed Intellectual Property Law Group LLP

(57) ABSTRACT

Systems, apparatus, and methods that provide a flexible current sensor capable of measuring current flowing through a conductor without contacting the conductor. In various implementations, a flexible current sensor may have a comparable size, shape, and appearance as a flexible loop of a Rogowski coil, except the current sensor described herein can sense direct current (DC). The current sensors of the present disclosure utilize a novel open loop degaussing mechanism to provide accurate DC current measurements in a conductor. To achieve this, a current sensor includes an AC degaussing coil wrapped around a magnetic core. A driver circuit drives an AC degaussing signal in the AC degaussing core, which operates to reset or degauss the magnetic core, thereby providing more accurate current measurements.

20 Claims, 6 Drawing Sheets

(58) Field of Classification Search
USPC ................ 324/117, 200, 300, 301, 307, 309
See application file for complete search history.

(56) References Cited

U.S. PATENT DOCUMENTS

| | | | | |
|---|---|---|---|---|
| 6,614,218 | B1* | 9/2003 | Ray | G01R 15/181 |
| | | | | 324/117 R |
| 7,847,543 | B2 | 12/2010 | Grno | |
| 9,541,581 | B2 | 1/2017 | Ringsrud | |
| 2003/0193331 | A1* | 10/2003 | Nath | G01N 27/9046 |
| | | | | 324/240 |
| 2006/0158798 | A1* | 7/2006 | Jackson | H02H 3/335 |
| | | | | 361/42 |
| 2010/0277328 | A1* | 11/2010 | Mullan | A01K 15/021 |
| | | | | 340/665 |
| 2011/0012589 | A1* | 1/2011 | Greenberg | G01R 15/181 |
| | | | | 324/127 |
| 2014/0176161 | A1* | 6/2014 | Davis | G01R 1/20 |
| | | | | 324/664 |
| 2015/0016006 | A1 | 1/2015 | Van Vroonhoven et al. | |
| 2016/0327593 | A1* | 11/2016 | Labbe | G01R 15/183 |
| 2019/0154736 | A1* | 5/2019 | Shigeta | G01R 33/24 |
| 2020/0011900 | A1 | 1/2020 | Cima | |
| 2023/0040987 | A1* | 2/2023 | Tang | G01R 15/207 |

FOREIGN PATENT DOCUMENTS

| | | |
|---|---|---|
| EP | 015 871 A1 | 5/2016 |
| JP | 6-201731 A | 7/1994 |
| JP | 2016-188790 A | 11/2016 |

OTHER PUBLICATIONS

Extended European Search Report for Application No. EP 24167661.8 dated Sep. 16, 2024, 9 pages.

* cited by examiner

NON-CONTACT DC CURRENT MEASUREMENT DEVICE WITH OPEN LOOP DEGAUSSING

BACKGROUND

Technical Field

The present disclosure relates to current sensing technologies, more specifically to direct current (DC) current sensing technologies, measurement devices, and methods.

Description of the Related Art

Typical non-contact current sensors capable of measuring direct current (DC) utilize clamp-type or jaw-type sensors having a rigid clamp positionable around an electrical component for measurement. A motor opens and closes the jaws of the clamp and aligns the jaws. Valid measurements require accurate jaw alignment.

Opening the jaws requires a large physical space. In addition, locating a clamp sensor around an electrical component in an electrical panel or other tight space can be awkward or cumbersome for a technician and may cause damage to the electrical component being measured or to nearby components. Vibrations from nearby heavy machinery may exacerbate these problems. Clamp sensors are typically heavier than a standard measurement tool because the jaws include large pieces of iron and a motor for opening, closing, and aligning the jaws.

Rogowski coils are current sensors that are lighter and more flexible than clamp-type current sensors. Rogowski coils are easier to use in tight spaces than most clamp sensors; however, Rogowski coils are not suitable for measuring DC current.

BRIEF SUMMARY

The following summary introduces a selection of concepts in a simplified form that are further described below in the detailed description. This summary is not intended to identify key features of the claimed subject matter, nor is it intended to be used as an aid in determining the scope of the claimed subject matter.

The present disclosure describes a measurement device that includes a current sensor that can measure direct current (DC) flowing through a conductor without contacting the conductor. The measurement device may include a measurement probe (or "current sensor") that includes a loop made of flexible magnetically conductive strands, one or more magnetic field sensors, an AC degaussing coil wrapped around the loop, and a signal cable that couples the magnetic field sensors and the AC degaussing coil to a measurement instrument of the measurement device. The one or more magnetic field sensors can be Hall Effect sensors, for example, and are placed in one or more corresponding gaps between the magnetically conducting material. The current sensor may be coupleable or coupled to the measurement instrument that calculates and displays the measured current values.

To mitigate the high magnetic remanence in a flexible magnetic core, an open loop AC degaussing signal (e.g., sine wave, sawtooth wave) may be applied to the flexible multi-stranded magnetic core, which operates to degauss or "reset" the magnetic memory of the flexible core. This is achieved by including a winding or coil that wraps around the flexible core and a driver circuit, also referred to herein as an AC degaussing signal generator, which is coupled to the winding. The driver circuit is configured to generate the AC degaussing signal in the winding which prevents the flexible core from retaining magnetism, which allows the magnetic field sensors to obtain more accurate current measurements. In at least some implementations, the AC degaussing signal is an always on, fixed frequency and magnitude signal, for example. Other signal shapes, magnitudes, frequencies, and timing may be used in other implementations. Further, in at least some implementations, the magnetic core is a rigid magnetic core instead of a flexible magnetic core.

In various embodiments, the current sensor may include multiple magnetic field sensors or additional magnetically conductive sections to improve accuracy and compensate for external magnetic fields. The current sensor may be used in combination with other sensors like a Rogowski coil, making it more convenient for technicians to carry and use multiple sensors with a single measurement device. The flexible current sensors of the present disclosure have potential applications in various electronic measurement devices, offering a more convenient and accurate way of measuring electrical currents without direct contact with conductors.

DETAILED DESCRIPTION

Figure 1:
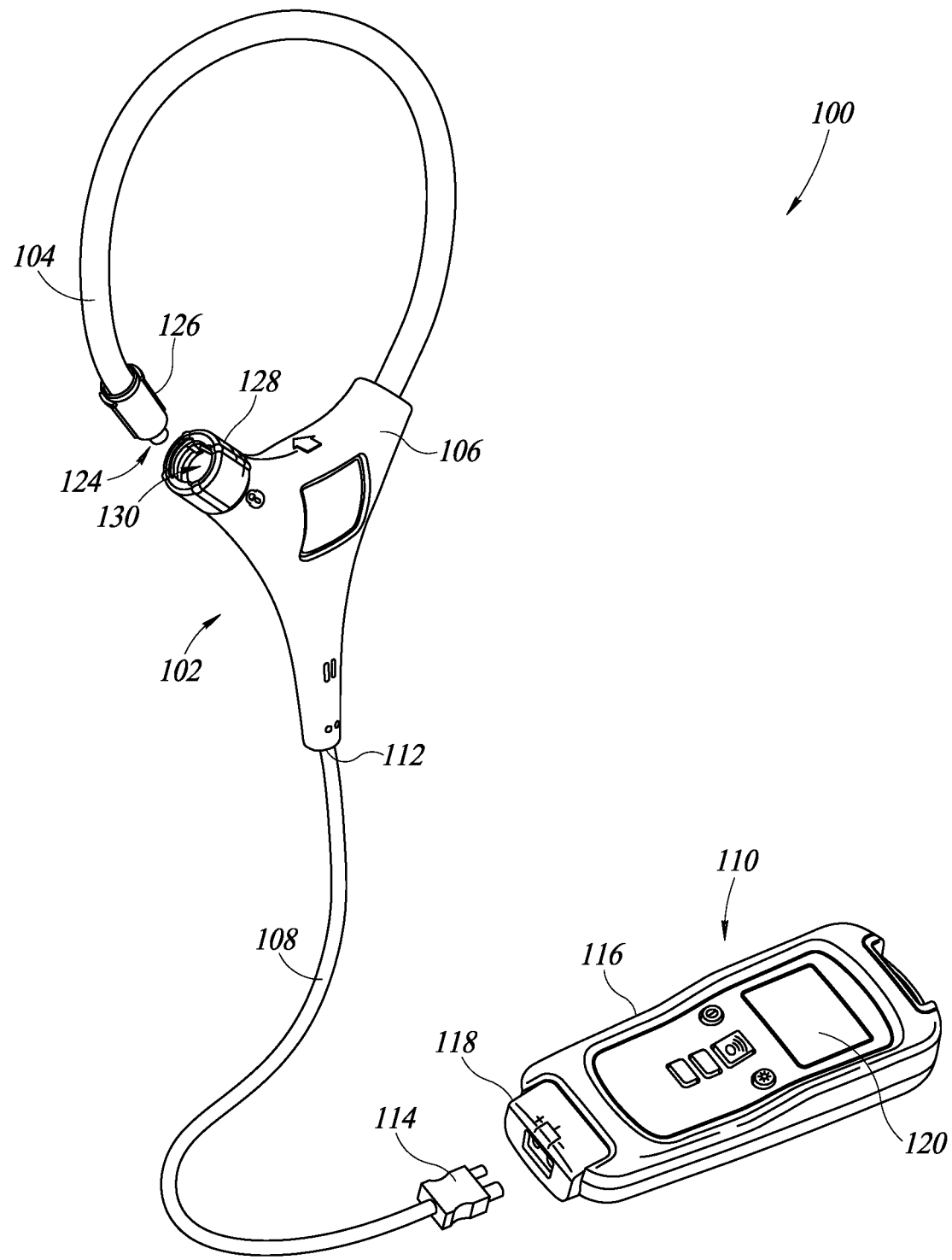
FIG. 1 is an example of a current measurement device having a loop that is open to receive a conductor under test, in accordance with one or more implementations of the present disclosure.

One or more implementations of the present disclosure are directed to systems, apparatus, and methods that relate to a current sensor capable of measuring current flowing through a conductor without contacting the conductor. In various implementations, a flexible current sensor is provided that has a comparable size, shape, and appearance as a flexible loop of a Rogowski coil. Unlike a Rogowski coil, however, the current sensors described herein are capable of sensing direct current (DC). In some implementations, the current sensor is capable of sensing alternating current (AC). As discussed further below, to provide this functionality, the current sensors of the present disclosure include a novel open loop AC degaussing mechanism to provide accurate DC measurements in a conductor under test.

Non-contact DC current sensors typically use a rigid magnetic core with one or more magnetic field sensors, such as Hall-effect sensors, which are placed in gaps of the magnetic core to measure the magnetic field, which is indicative of the current flowing through the conductor under test. The rigid core acts as a magnetic concentrator for the magnetic field sensors and provides magnetic shielding. However, the rigid core design can often restrict the use of DC current sensors in areas of limited space. To address this limited space issue, one or more implementations of the present disclosure provide a flexible, multi-stranded magnetic core as the magnetic concentrator instead of a rigid core.

Compared to rigid cores, multi-stranded flexible magnetic cores that have sufficient strength for practical applications exhibit relatively high magnetic remanence ("memory") due to the magnetic hysteresis effect, which causes error in the measurements by the magnetic field sensors. To mitigate the high magnetic remanence in a flexible magnetic core, in one or more implementations of the present disclosure an open loop AC degaussing signal (e.g., sine wave, sawtooth) is applied to the flexible multi-stranded magnetic core. Such an AC degaussing signal is used to degauss or "reset" the magnetic memory of the flexible core, preventing the buildup of a magnetic field in the core that increases measurement error. This is achieved by including a winding or coil that wraps around the flexible core and a driver circuit, also referred to herein as an AC degaussing signal generator, which is coupled to the winding. The driver circuit is configured to generate the AC degaussing signal in the winding which prevents the flexible core from retaining magnetism, which allows the magnetic field sensors to obtain more accurate current measurements.

Generally, closed-loop degaussing systems require a coil to be driven with a DC current that (1) scales with the amplitude of the current in the conductor under test, and (2) requires knowledge about the current under test, which requires a feedback system. This demands a significant amount of power, which is undesirable, especially for battery-powered devices. In contrast, the open-loop AC degaussing signal generated in implementations of the present disclosure requires much less power than existing closed-loop systems. As noted above, existing closed-loop systems require circuitry to provide information about the magnitude of the current under test and require additional circuitry to drive a coil with a current sufficient to counteract the bias introduced by the current in the conductor under test, which scales with the magnitude of the measured current. In contrast, in at least some implementations discussed herein, the open-loop design of the present disclosure utilizes relatively simple circuitry to generate a fixed amplitude and fixed frequency AC signal (e.g., a sine wave) that runs continuously during the measurement.

As noted above, with the open loop degaussing design of the present disclosure, a much simpler signal generator may be used. There is no need for complex feedback control, amplifiers that can drive a significant amount of current, or a control system that precisely controls the timing of obtaining measurements and generating a degaussing signal. Additionally, use of a fixed magnitude AC signal in some implementations further reduces the cost and complexity of the design relative to use of a more complex signal (e.g., sinc function).

As discussed elsewhere herein, the implementations of the present disclosure provide numerous technical advantages. Some of these technical advantages are discussed further below.

In at least some implementations, an AC degaussing winding or coil is provided that is wrapped around a magnetic core of a DC current sensor, and an AC degaussing signal generator circuit is further provided that generates an AC degaussing signal that is independent of the current flowing through the conductor under test. This feature advantageously reduces power consumption significantly relative to closed-loop degaussing systems. It does not require generation of a large DC drive current that scales with the magnitude of the current under test. It also does not require knowledge of the current under test and the associated circuitry for that functionality.

Additionally, in at least some implementations, the winding is driven with an AC degaussing signal that has a fixed amplitude or frequency. This provides reduced cost, fewer components, and lower complexity relative to using more complex functions (e.g., sinc function).

Further, in at least some implementations, the AC degaussing signal is active during the measurement of current in the conductor under test. In other systems, a degaussing signal is turned on for a period of time to degauss the core and is then turned off before a measurement is obtained. However, in such systems, the magnetic core builds up magnetism very quickly, so obtaining a measurement even a brief period of time after the degaussing signal is turned off can cause inaccurate measurements. By activating the AC degaussing signal while the measurement is being obtained, as in at least some implementations discussed herein, the magnetic core does not build up magnetism leading up to the measurement because the measurement is obtained while the degaussing signal is active. Further, there is no need to control the precise timing of the degaussing signal and the measurement since the degaussing can be "always on."

Conventional systems may drive a relatively large current degaussing signal through a winding. As an improvement, various embodiments disclosed herein use a voltage signal instead of a current signal for a degaussing signal. The power required by the components in a voltage degaussing signal topology, as disclosed, is usually less than a current degaussing signal.

Further, in at least some implementations, the magnetic field sensor signals are smoothed (e.g., averaged) to remove or reduce any jitter caused by the AC degaussing signal being active during the measurement. Non-limiting examples of smoothing algorithms include one or more types of averaging algorithms, filtering algorithms, etc. This feature advantageously allows the AC degaussing signal to be active while the measurement is being obtained, or at least allows for more accurate measurements to be obtained while the degaussing signal is active. Without smoothing of the magnetic field sensor signal, the AC degaussing signal may create a jitter in the magnetic field induced in the core and sensed by the magnetic field sensor. This averaging or filtering feature retains the DC component in the induced field, which represents the current flowing through the conductor under test, while filtering out the AC component introduced by the AC degaussing signal. This feature also reduces complexity and cost by allowing for an "always on" degaussing signal that does not require the specific timing requirements required by systems that turn off the degaussing signal prior to taking a measurement.

The various features of the implementations of the present disclosure are discussed further below with reference to the figures.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including." and is inclusive or open-ended (i.e., does not exclude additional, unrecited elements or method acts).

Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise.

For the purposes of the present disclosure, unless otherwise indicated, the phrase "A and B" is nonlimiting and means one or more of (A) and one or more of (B); the phrase "A or B" is nonexclusive and means one or more of (A), one or more of (B), or one or more of (A and B); the phrase "A and/or B" means one or more of (A), one or more of (B), or one or more of (A and B); the phrase "at least one of A and B" and the phrase "one or more of A and B" both mean one or more of (A) and one or more of (B); and the phrase "at least one of A or B" and the phrase "one or more of A or B" both mean one or more of (A), one or more of (B), or one or more of (A and B). By way of extension, for example, the phrases "at least one of A, B, or C" and "one or more of A, B, or C" both mean one or more of (A), one or more of (B), one or more of (C), one or more of (A and B), one or more of (A and C), one or more of (B and C), or one or more of (A, B and C). In the above, A, B, and C represent any form or type of element, feature, arrangement, component, structure, aspect, action, step, etc.

FIG. 1 shows a measurement device 100 having a current sensor portion 102 ("current sensor") and a measurement instrument 110. The current sensor 102 includes a flexible loop 104 that includes a magnetically conductive material or "magnetic core." The magnetic core is positionable to surround a conductor under test, as discussed below. In at least some implementations, the magnetically conductive material includes a plurality of magnetically conductive strands. The strands, and therefore the loop 104, may be flexible or bendable. As discussed further below, each of the strands may include an outer layer of insulator material that helps insulate the strands from one another. Rather than using a heavy, rigid jaw that opens and closes with a motor, the current sensor 102 uses the loop 104 to sense the flow of electrical current in a conductor contained within the loop. In at least some implementations, the loop 104 may be opened and closed such that it may be placed around a conductor C (see FIG. 2) under test without interrupting the current flowing through the conductor.

As discussed in more detail herein, the plurality of flexible magnetically conductive strands in the loop 104 may be woven, braided, twisted, or arranged in patterns. The loop 104 also includes at least one magnetic field sensor, not shown in FIG. 1, and a signal cable 108 that may include a flexible portion. The signal cable 108 may be coupled to one or more components of the loop 104, such as the one or more magnetic field sensors.

As discussed further below with reference to FIG. 3, the one or more magnetic field sensors may be placed in corresponding one or more gaps of the magnetic core, which may therefore comprise multiple sections separated by one or more gaps. Several types of magnetic field sensors may be used. As a non-limiting example, the one or more magnetic field sensors include a Hall-Effect sensor. In at least some implementations, the loop 104 includes a pendant 106 that contains one or more magnetic field sensors and protects the magnetic field sensors.

The current sensor 102 is coupled or couplable to the measurement instrument 110. The signal cable 108 may extend from a lower portion 112 of the pendant 106 and may include a coupler 114 that is input into a corresponding coupler or port 118 in a housing 116 of the measurement instrument 110. The measurement instrument 110 includes circuitry capable of receiving an output provided by the current sensor 102, calculating a current value, and outputting or presenting the calculated current values to a user. The circuitry of the measurement instrument may further be operable to generate an AC degaussing signal, as discussed further below. The circuitry of the measurement instrument 110 may provide other functions as well, such as receiving inputs from other sensors and calculating measurements. The measurement instrument 110 may be embodied as various electronic measurement devices, such as a multimeter, for example. Measured values representing current flow sensed by the current sensor 102 may be displayed on the display 120 of the measurement instrument 110.

Besides being coupled or couplable to the current sensor 102, the measurement instrument 110 may be coupled or couplable to a Rogowski coil or one or more other sensors (e.g., voltage sensors, current sensors). For example, the coupler 114 may be substantially the same as a coupler from a Rogowski coil, and either the current sensor 102 or a Rogowski coil may be input into the coupler or port 118 in the housing 116 of the measurement instrument 110. In some implementations, the measurement instrument 110 may have multiple ports or may include wireless communication capabilities to communicate with the current sensor 102 or other sensors and devices. In some implementations, the measurement instrument 110 may be couplable or coupled to a Rogowski coil and the current sensor 102 at the same time to provide functionality for both AC and DC measurements.

The measurement instrument 110 may be configured to selectively display measured values input from either the current sensor 102 or a Rogowski coil in response to a user input to the measurement instrument 110. Such implementations may allow a technician to carry the measurement instrument 110 and use the measurement instrument with the current sensor 102 and other sensors, rather than carrying a separate measurement device for each sensor. For example, the technician may use the measurement instrument 110 with a Rogowski coil to measure AC currents and the current sensor 102 to measure DC currents. This may reduce the size and weight of equipment that a technician must carry around the worksite and may also reduce the number of trips back-and-forth at a worksite to swap measurement devices.

Still referring to FIG. 1, the loop 104 of the current sensor 102 may include a first end 124 having a fastener element 126. The loop 104 may have a fastener receiver 128 attached at or near a second end 130 of the loop 104. The fastener element 126 and the fastener receiver 128 are configured to mate with one another. For example, the fastener element 126 and the fastener receiver 128 may comprise a quarter turn-type fastener and a compatible fastener receiver, respectively. At least one magnetic field sensor may be positioned at one of the first end 124 and the second end 130, and a magnetically conductive material may be positioned at the other one of the first end 124 and the second end 130.

The magnetically conductive material may provide a magnetic field to a sensing element of the at least one magnetic field sensor. A gap may exist between a magnetic field sensor and the magnetically conductive material, and the magnetic field from the magnetically conductive material may pass across the gap.

Consistent and precise positioning of the loop 104 and the one or more magnetic field sensors may help achieve accurate and reliable measurements. In some implementations, the gap between the magnetically conductive material and the magnetic field sensor is minimized. Minimizing the gap may reduce field loss and interference from external fields. In some implementations, mating of the fastener element 126 and the fastener receiver 128 automatically positions or aligns the magnetically conductive material with the magnetic field sensor such that a magnetic field is focused through the magnetic field sensor. Mating between the fastener element 126 and the fastener receiver 128 may position the first end 124 and the second end 130 adjacent to one another, align a magnetic field provided by the strands and the magnetic field sensor, and/or minimize the gap between the magnetically conductive material and the magnetic field sensor.

Figure 2:
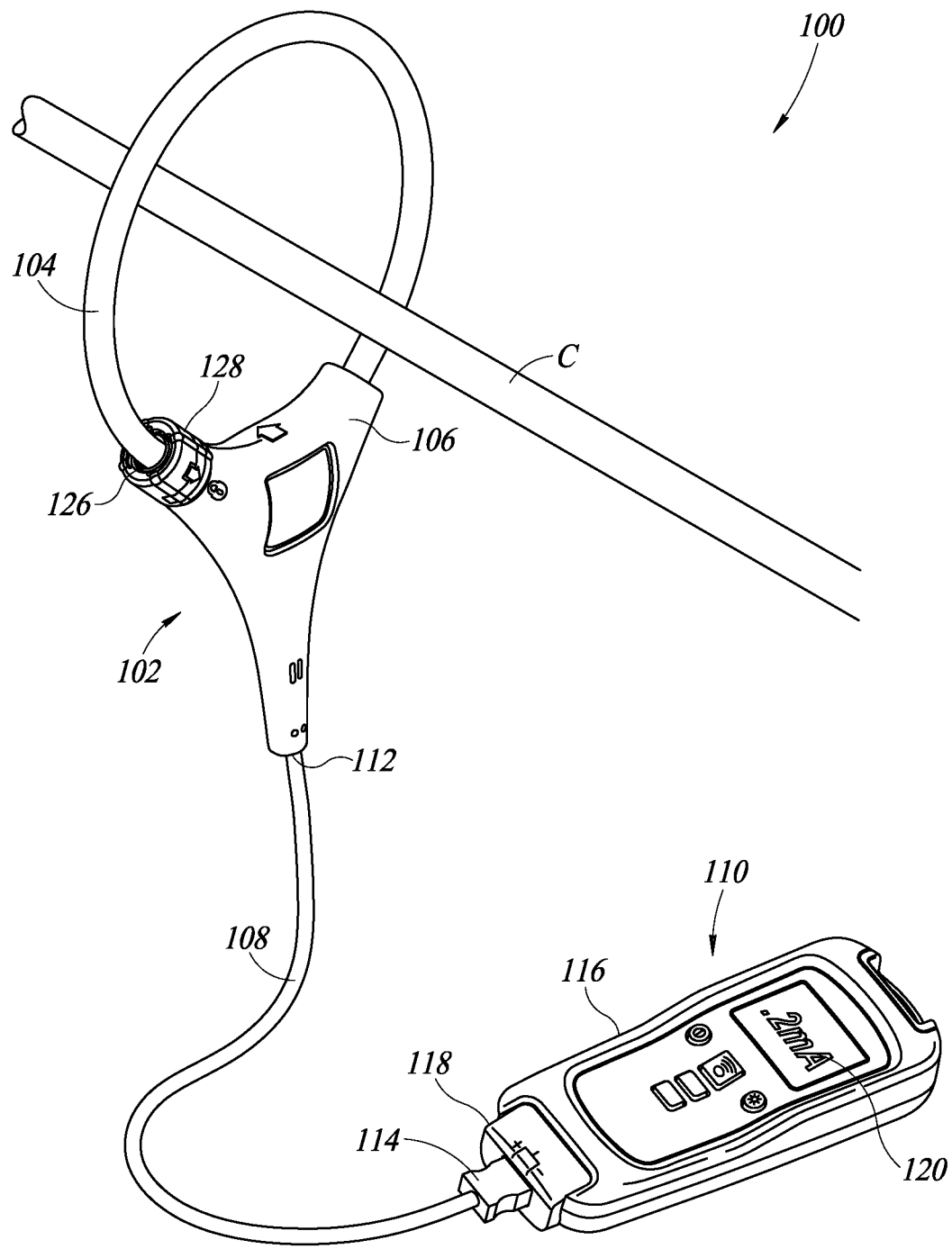
FIG. 2 is an example of the current measurement device of FIG. 1 with the loop closed around a conductor to measure a current flowing through the conductor, in accordance with one or more implementations of the present disclosure.

FIG. 2 shows the current sensor 102 in operation. The current sensor 102 is connected to the measurement instrument 110 via the signal cable 108. The loop 104 is closed and is located around the conductor C that has a DC current flowing through it. The fastener element 126 and the fastener receiver 128 are mated, and the magnetically conductive material, such as the strands, and the magnetic sensor are aligned via the mating. A measured current value of 0.2 mA is displayed on the display 120 as a non-limiting example.

Figure 3:
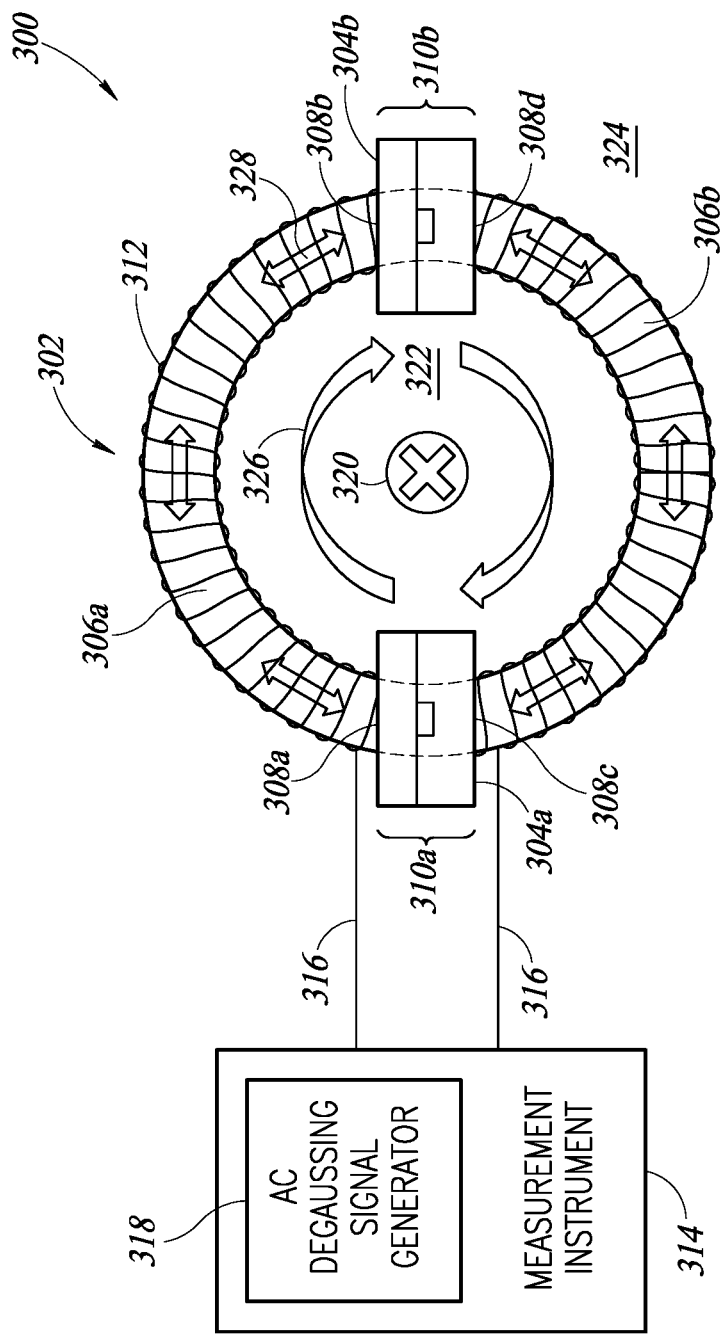
FIG. 3 is a block diagram of a current measurement device having a loop that includes two magnetic field sensors located between magnetically conductive sections or cores, and further including a degaussing coil, in accordance with one or more implementations of the present disclosure.

FIG. 3 shows a measurement device 300 having a loop portion 302 comprising two magnetic field sensors 304a and 304b ("magnetic field sensors 304") and a magnetically conductive section 306, also referred to as a "magnetic core," that includes a first portion 306a and a separate second portion 306b. The measurement device 300 may share numerous similarities or possess identical features with the measurement device 100 depicted in FIG. 1. Accordingly, the description of FIG. 1 is not reiterated herein in the interest of brevity.

As shown in FIG. 3, the measurement device 300 is in a closed position that defines an interior space 322 that contains a conductor 320 under test and an exterior space 324 outside of the loop. The magnetically conductive section 306a may have a first end 308a and a second end 308b. Similarly, the magnetically conductive section 306b may have a first end 308c and a second end 308d. In at least some implementations, each of the magnetically conductive sections 306 includes a plurality of strands of magnetically conductive materials. The loop 302 may be coupled to a measurement instrument 314 via a signal cable 316, which may provide suitable electrical connections or circuitry to couple any components of the loop 302 to the measurement instrument 314. A gap 310a may be defined between the ends 308a and 308c of the magnetically conductive sections 306a and 306b, respectively. Similarly, a gap 310b may be defined between the ends 308b and 308d of the magnetically conductive sections 306a and 306b, respectively.

The magnetic field sensor 304a is positioned in the gap 310a, and may be attached or attachable to at least one of the first end 308a of the magnetically conductive section 306a and the first end 308c of the magnetically conductive section 306b. Similarly, the magnetic field sensor 304b is disposed in the gap 310b, and may be attached or attachable to at least one of the first end 308b of the magnetically conductive section 306a and the first end 308d of the magnetically conductive section 306b. One or more of ends 308a-308d may be positioned adjacent to the magnetic field sensors 304a-304b without being attached thereto. As discussed above with reference to FIG. 1, the device 300 may include one or more fasteners that allow the loop to be opened and closed by the technician. The one or more fasteners may be positioned adjacent one or more of the magnetic field sensors or may be positioned in the loop spaced apart from the one or more magnetic field sensors. A magnetic field, indicated by arrow 326, that is generated by the current flowing through the conductor 320 may be concentrated or focused by the magnetically conductive section 306.

The DC current measurements determined by the measurement device 300 may be obtained using "open loop" current sensing or "closed loop" current sensing. The magnetic field sensor 304 may provide an output signal indicative of a current flowing through the conductor 320 encircled by the loop 302. For example, the magnetic field sensor 304 may be a Hall Effect sensor, and Hall voltage of the sensor may be provided as an output signal to the measurement instrument 314.

As shown in FIG. 3, the measurement device 300 includes a coil or winding 312 that is external to and wraps around the magnetically conductive section 306. The coil 312, referred to herein as an AC degaussing coil or winding, is electrically conductive and may be coupled to the signal cable 316, which in turn is coupled to an AC degaussing signal generator circuit 318, as discussed further below. The measurement device 300 uses the AC degaussing signal generator circuit 318 to generate an AC voltage in the coil that degausses or "resets" the magnetically conductive section 306. The coil 312 may be wrapped around substantially the entire loop 302 or a portion thereof.

As discussed above, compared to rigid cores, the multi-stranded flexible magnetically conductive portion or core 306 may exhibit relatively high magnetic remanence ("memory") due to the magnetic hysteresis effect, which causes error in the measurements by the magnetic field sensors 304. The open loop AC degaussing signal (e.g., sine wave, sawtooth) generated by the AC degaussing signal generator circuit 318 is applied to the magnetically conductive section 306, which operates to degauss or "reset" the magnetic memory of the flexible core. The AC degaussing signal in the winding 312 prevents the flexible core from retaining or building up magnetism, which allows the magnetic field sensors to obtain more accurate current measurements as they sense the magnetic field in the magnetic core to determine the current in the conductor under test.

In at least some implementations, the open-loop design of the present disclosure utilizes circuitry to generate a fixed amplitude and/or fixed frequency AC signal (e.g., a 5 V sine wave, a 10 V sawtooth wave) that runs continuously during the measurement. As non-limiting examples, in at least some implementations the AC degaussing signal has a magnitude that is between 1 volt and 30 volts, between 4 volts and 20 volts, or between 6 volts and 12 volts. In at least some implementations, the AC degaussing signal has a frequency that is between 1 Hertz and 1,000 Hertz, between 10 Hertz and 250 Hertz, or between 25 Hertz and 100 Hertz.

As discussed above, the measurement device 300 may include fewer or more than two magnetic field sensors. Using two magnetic field sensors that are positioned across the internal space of the loop 302 from one another may help compensate for external fields in the external space 324. By canceling or reducing the impact of magnetic influences from the external space 324, the coil 312 may help reduce measurement inaccuracies.

The loop 302 may include an insulator material layer. The first magnetically conductive section 306a, the first magnetic field sensor 304a, the second magnetically conductive section 306b, and the second magnetic field sensor 304b may be covered by the insulator material layer. The length of the first magnetically conductive section 306a and the length of the second magnetically conductive section 306b may be substantially the same in at least some implementations. In at least some implementations, the first magnetic field sensor 304a and the second magnetic field sensor 304b may be located across the internal space 322 from one another. The loop 302 may further include a fastener, as discussed above with reference to FIGS. 1 and 2. The loop 302 may be opened and closed, and may be placed around or encircle an electrical component or conductor to be measured, such as the conductor 320 shown in FIG. 3.

Other implementations are possible. For example, in addition to the first magnetically conductive section 306a and the second magnetically conductive section 306b, the loop 302 may include one or more additional separate sections of a magnetically conductive material. Additional magnetic field sensors may be disposed in gaps between the sections of magnetically conductive material. Also, the current sensors of the present disclosure may use different magnetic field sensors. For example, the magnetic field sensors may include one or more of a Hall Effect sensor, a flux gate, an anisotropic magnetoresistor (AMR) sensor, or a giant magnetoresistance (GMR) sensor. The magnetic field sensors may include other devices capable of measuring an intensity of a magnetic field in the gaps.

Figure 4:
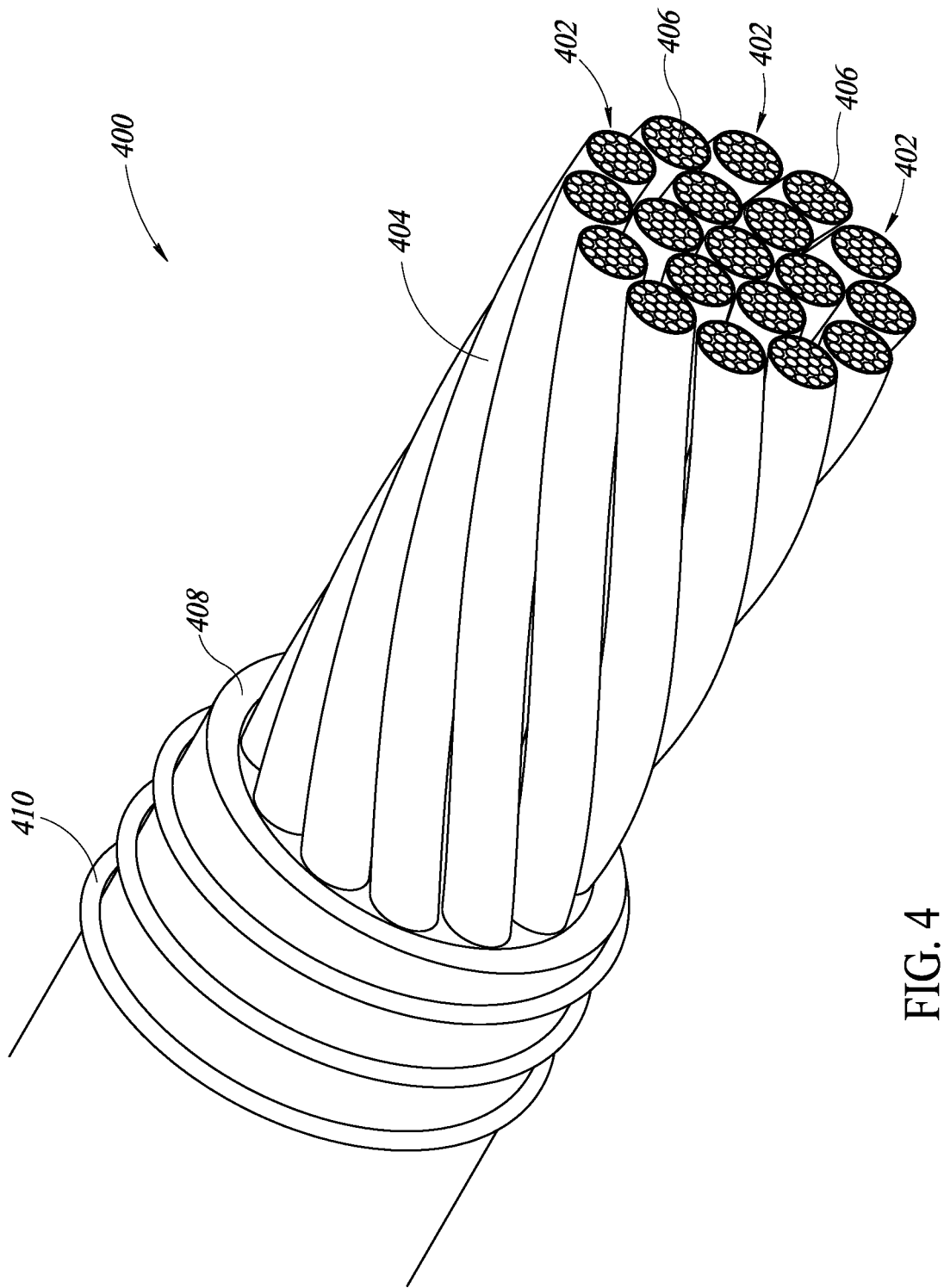
FIG. 4 illustrates a cross-sectional view of a magnetic core that includes a bundle of magnetically conductive strands and a degaussing coil, in accordance with one or more implementations of the present disclosure.

FIG. 4 shows a cross-sectional view of an example bundle 400 that includes a plurality of magnetically conductive strands 402 that may form a portion of a magnetically conductive portion or core, such as the cores described elsewhere herein. In at least some implementations, the strands 402 are arranged such that their relative positions with respect to one another change over a length of the bundle 400. The strands comprise an inner portion 406 that includes a magnetically conductive material. The strands may include an outer portion 404 having an insulator material for insulating the strands from one another. Strands with and without the outer portion of the insulator material are suitable for various implementations of this disclosure. Using multiple strands minimizes eddy effect that can cause currents to form in the sensor, causing heating of the sensor and limiting its ability to measure the magnetic field. Using a multiple of strands may also allow for the magnetically conductive sections to be more flexible or bendable.

In some implementations, the strands alternate from being in an inner portion and in an outer portion of the bundle 400 such that the strands are in the inner portion about the same amount of length as the strands are in the outer portion of a bundle for a length of the bundle. In some implementations, the strands may be located the same amount, on average, in an inner portion and an outer portion for a length of a bundle 400. Various patterns may be used in arranging the strands. In some implementations, the proportion of overall length that each strand is in the outside portion or the outside portion of the bundle 400 is about the same. These patterns may provide electrical and mechanical advantages such as allowing for a loop in a current sensor, as described herein, to be durable and flexible. Various patterns of arranging strands and/or strand sizes may allow for the bundle to be resilient. Some patterns may allow the loop to be flexible and also resilient. Such properties provide significant advantages over existing current sensors.

As discussed above in relation to FIG. 3, accurate and consistent positioning of the magnetically conductive material with respect to one or more magnetic field sensors can be important for providing accurate and consistent measurements. The distance between the ends of the strands and a magnetic field sensor may be minimized, and the strands may be aligned with the magnetic field sensor. Some magnetically conductive materials may not be as flexible as typical conductor materials, and some strands could stiffen and/or break with time and usage, causing a change in dimensions by a few thousands of an inch. Such a change in positioning of strands relative to a magnetic field sensor could cause inconsistent measurements. In some implementations, a precise distance between strands and a magnetic field sensor is achieved by polishing the ends. In some implementations, the ends of the strands are sealed with epoxy to help consistently maintain the locations of the strands after the strands have been bent.

The bundle 400 may include a degaussing winding or coil 410 wrapped around the bundle, as discussed above with reference to the coil 312 of FIG. 3. The winding 410 may be wrapped over the insulation layer 408, or may be included within the insulation layer 408. Additionally or alternatively, an insulation or protective layer may be provided over the winding 410 to protect and provide insulation for the entire bundle 400 including the winding 410.

Various combinations of patterns of strands and bundles may be utilized with implementations of the current sensors disclosed herein. Various winding techniques may arrange the strands and/or bundles of strands. In some implementations, Litz winding techniques may be used such that the strands are arranged in a Litz pattern. For example, the strands may include a magnetically conductive material, and be arranged similar to Round Type 2 wire by New England Wire Technologies.

The bundle may be sized and configured such that an end of the bundle overlaps with a sensing element of a magnetic field sensor. For example, the number of strands included in the bundle and the shape of the bundle may be determined based on the size of the sensing element and the cross-sectional area of the strands, including the inner portion and the outer portion of the bundle. For example, for the end of the bundle to overlap with the sensing element of the magnetic field sensor, the surface area and dimensions of the sensing element may be such that a cross-sectional area at the end of the bundle is greater than an area of the sensing element of the magnetic field sensor so that magnetic fields from the strands in the bundle are sensed by the magnetic field sensor.

The magnetically conductive material in the implementations of this disclosure may have a magnetically permeability of at least $5.0 \times 10^{-3}$ H/m, for example. A material having such magnetic permeability material increases the magnetic field near the material, which may help to focus the magnetic field across a gap that includes the magnetic field sensor. Increasing the magnetic permeability of the strands may increase the sensitivity of the current sensor, such as current sensors discussed herein. For example, the magnetically conductive material in the inner portion of the strands may include a nickel-iron alloy, such as electrical steel.

In some implementations, the magnetically conductive material of the strands includes a mumetal. Mu-metals may have magnetic permeabilities of at least $2.5 \times 10^{-2}$ H/m. Examples of commercially available mu-metals include MuMETAL, Mumetal1, and Mumetal2. Mu-metals may be formed into a thin wire. It is also desired that the strands comprise a material that is ductile and workable. A magnetic permeable material having good resiliency for the strands such that the bundle 400 does not yield or bend permanently when placed around an electrical component or conductor to be tested may provide significant advantages. Mu-metals strands have advantageous resiliency properties and are more ductile and workable than other nickel-iron alloys. Materials with a low loss tangent, such as electrical steel, may be used. Using materials with low loss tangent may provide improved accuracy and repeatability properties.

In operation, a magnetic field may be passed from an end of a plurality of insulated magnetically conductive strands of a magnetically conductive loop to a magnetic field sensor positioned adjacent to the end of the plurality of insulated magnetically conductive strands. A signal may be output by the magnetic field sensor that represents the current flowing through the electrical component or conductor being tested based on the magnetic field passed from the end of the plurality of strands.

Figure 5:
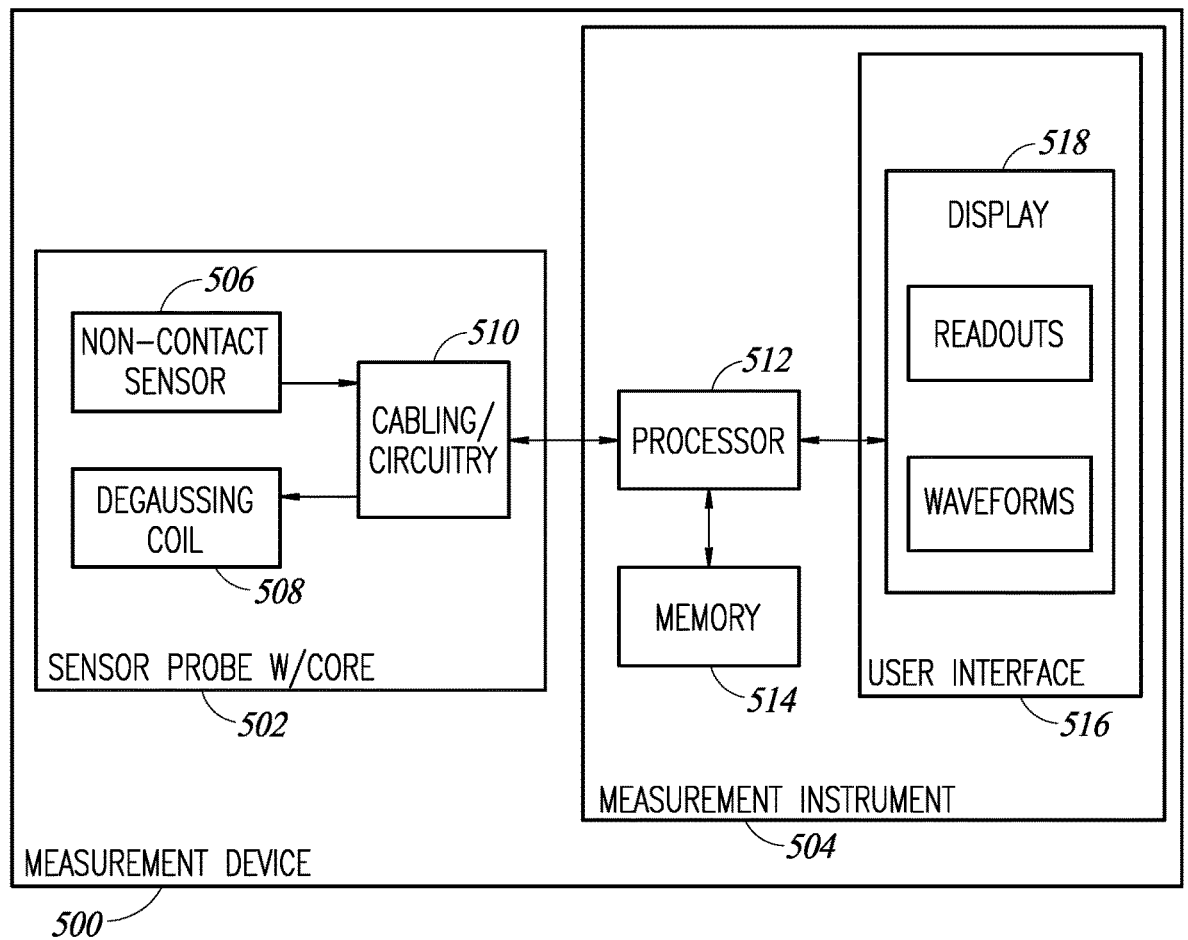
FIG. 5 is a schematic block diagram of a current measurement device, in accordance with one or more implementations of the present disclosure.

FIG. 5 shows a schematic block diagram of the electrical components of a measurement device 500, which includes a measurement instrument 504 and a sensor probe with a magnetic core 502. The measurement device 500 may be similar or identical to any of the measurement devices discussed herein. As discussed above, the sensor probe 502 includes a non-contact sensor 506 and a degaussing coil 508 that are operatively coupled to cabling or circuitry 510, which is operatively coupled to the measurement instrument 504.

The measurement instrument 504 includes processing and/or control circuitry 512, a user interface 516, which includes the display 518, and memory 514. The user interface 516, including the display 518, provides measurement results and other information to the user. The user interface 516 is further configured to receive user input information such as measurement instructions or other information. The display 518 may provide readouts and waveforms indicative of the measurements received from the sensor probe 502 for communicating to the user. The display 518 may be a display of any suitable type, such as a liquid crystal display (LCD), a light-emitting diode (LED) display, an organic LED display, a plasma display, or an e-ink display. The user interface 516 may include various inputs and outputs, include wired or wireless communications interfaces, audio inputs or outputs, visual outputs, touch screen inputs, buttons, knobs, wheels, or other types of user interface elements.

The processing and/or control circuitry 512 of the measurement instrument 504 includes circuitry for sending, receiving, and/or processing signals to and from the non-contact sensor 506. The circuitry 512 is further operative to generate the AC degaussing signal that is provided to the degaussing coil 508 wrapped around the magnetic core of the sensor probe with core 502. The circuitry 512 may process the received signals and outputting signals to the user interface 516. The received signals may include signals indicative of electrical parameters, such voltage and current.

The circuitry 512 may be configured to determine one or more electrical parameters, such as power or phase angle. The circuitry 512 may additionally or alternatively include conditioning or conversion circuitry that is operative to condition or convert the signals into a form receivable by another measuring instrument, such as an analog form (e.g., 0-1 V) or a digital form (e.g., 8 bits, 16 bits, 64 bits). The circuitry 512 may include one or more processors (e.g., microcontroller, DSP, ASIC, FPGA), one or more types of memory (e.g., ROM, RAM, flash memory, other nontransitory storage media), and/or one or more other types of processing or control related components.

In some implementations, the measurement instrument 504 is configured for wireless communication to another instrument. The wireless communication may include a wireless communications subsystem such as a Bluetooth® module, a Wi-Fi® module, a ZIGBEE® module, a near field communication (NFC) module, etc. The measuring instrument 504 may be operative to communicate wirelessly via the wireless communications subsystem with an external system, such as a computer, smart phone, tablet, personal digital assistant, etc., so as to transmit measurement results to the external system or to receive instruction signals or input information from the external system. The measuring instrument 504 may additionally or alternatively include a wired communications subsystem, such as a USB interface, etc.

Although not shown, the measurement instrument 504 includes a power supply, such as a battery or battery pack, for supplying power to the various electrical components of the measurement instrument 504 and the sensor probe 502. The measurement instrument may additionally or alternatively include a port for coupling to an external power supply.

Figure 6:
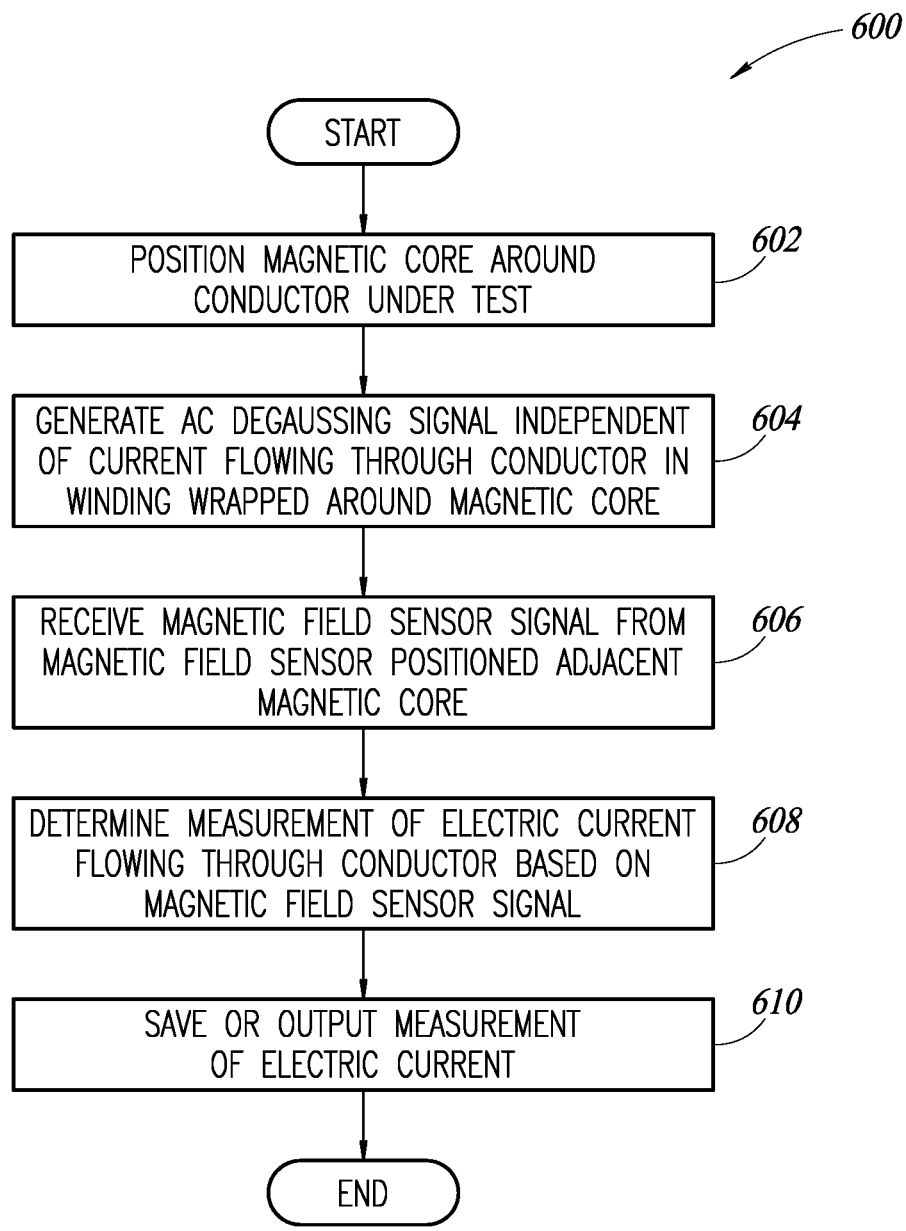
FIG. 6 is a flow diagram of a method of operating a current measurement device, in accordance with one or more implementations of the present disclosure.

FIG. 6 shows a method 600 of operating a measurement device, such as any of the measurement devices disclosed herein. At 602, the method 600 includes positioning a magnetic core of the current measurement device around a conductor under test. The magnetic core may be a rigid core, a flexible core, or any combination thereof. The magnetic core may be a flexible core comprised of multiple, flexible strands of wire. At 604, circuitry of the measurement device may generate an alternating current (AC) degaussing signal in a winding wrapped around the magnetic core, wherein the AC degaussing signal is independent of a current flowing through the conductor. The AC degaussing signal may be a fixed magnitude and/or fixed frequency signal, such as a fixed voltage sine wave or sawtooth wave. As a non-limiting example, the AC degaussing signal may have a magnitude that is between 4 volts and 20 volts, and a frequency that is between 10 Hertz and 250 Hertz. In at least some implementations, the magnitude or frequency of the AC degaussing signal may be variable.

At 606, the circuitry receives a magnetic field sensor signal from a magnetic field sensor (e.g., one or more Hall-effect sensors) of the measurement device, wherein the magnetic field sensor signal represents a magnetic field induced in the magnetic core. In at least some implementations, the AC degaussing signal may be active concurrently with the receiving of the magnetic field sensor signal from the magnetic field sensor representing the magnetic field induced in the magnetic core.

At 608, the circuitry determines a measurement of electric current flowing through the conductor based on the magnetic field sensor signal. In at least some implementations, to determine the measurement of electric current flowing through the conductor based on the magnetic field sensor signal, the circuitry may average or otherwise filter a plurality of measurements from the magnetic field sensor to account for jitter introduced by the AC degaussing signal. Thus, the resulting measurement accurately represents the DC component of the magnetic field in the magnetic core, which corresponds to the DC current in the conductor under test, because the AC component due to the degaussing signal is filtered out by the averaging of the received magnetic field sensor signals.

At 610, the measurement device may save or output the current measurement for use be a technician or for other purposes. As discussed above, the measurement device may include a user interface which may include various types of inputs, outputs, wired or wireless communication interfaces, etc.

EXAMPLES

One example embodiment includes a measurement device. The measurement device includes a magnetic core that is positionable to surround a conductor under test. The measurement device also includes a magnetic field sensor positioned adjacent to the magnetic core, and a winding wrapped around at least a portion of the magnetic core. The measurement device also includes circuitry coupled to the winding and the magnetic field sensor. In operation, the circuitry: generates an alternating current (AC) degaussing signal in the winding, the AC degaussing signal being independent of a current flowing through the conductor; receives a magnetic field sensor signal from the magnetic field sensor representing a magnetic field induced in the magnetic core; and determines a measurement of electric current flowing through the conductor based on the magnetic field sensor signal.

Implementations may include one or more of the following features, in any combination. The magnetic core may be flexible, for example, in at least some implementations the magnetic core is a flexible, multi-stranded magnetic core. The AC degaussing signal may be a fixed magnitude AC voltage signal and/or a fixed frequency AC voltage signal. The AC degaussing signal may have a magnitude that is between 1 volt and 30 volts. The AC degaussing signal may have a frequency that is between 1 Hertz and 1,000 Hertz. The AC degaussing signal may be active concurrently with the receiving of the magnetic field sensor signal from the magnetic field sensor representing the magnetic field induced in the magnetic core. The magnetic field sensor may include a Hall-effect sensor. The magnetic field sensor may include two or more Hall-effect sensors. In at least some implementations, the circuitry averages a plurality of measurements from the magnetic field sensor to account for jitter introduced by the AC degaussing signal.

One or more embodiments may include a method that includes: positioning a magnetic core around a conductor under test; generating an alternating current (AC) degaussing signal in a winding that is wrapped around at least a portion of the magnetic core, the AC degaussing signal being independent of a current flowing through the conductor; receiving a magnetic field sensor signal from a magnetic field sensor that is positioned adjacent the magnetic core, the magnetic field sensor signal representing a magnetic field induced in the magnetic core; and determining a measurement of electric current flowing through the conductor based on the magnetic field sensor signal.

Implementations may include one or more of the following features. Positioning the magnetic core may include positioning a flexible magnetic core around the conductor under test. Positioning the magnetic core may include positioning a flexible, multi-stranded magnetic core around the conductor under test. Generating the AC degaussing signal may include generating an AC degaussing signal that has a fixed magnitude and a fixed frequency.

The various implementations described above can be combined to provide further implementations. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the implementations can be modified, if necessary to employ concepts of the various patents, applications, and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A measurement device, comprising:
a magnetic core that is positionable to surround a conductor under test;
a magnetic field sensor positioned adjacent to the magnetic core;
a winding wrapped around at least a portion of the magnetic core; and
circuitry coupled to the winding and the magnetic field sensor, wherein the circuitry is configured to:
generate a fixed magnitude alternating current (AC) degaussing signal in the winding, the AC degaussing signal being independent of a current flowing through the conductor;
receive a magnetic field sensor signal from the magnetic field sensor representing a magnetic field induced in the magnetic core; and
determine a measurement of electric current flowing through the conductor based on the magnetic field sensor signal.

2. The measurement device of claim 1 wherein the magnetic core is a flexible, multi-stranded magnetic core.

3. The measurement device of claim 1, wherein the circuitry is configured to generate the AC degaussing signal continuously during measurement of the magnetic field by the magnetic field sensor.

4. The measurement device of claim 1, wherein the AC degaussing signal is a fixed frequency AC voltage signal.

5. The measurement device of claim 1, wherein the AC degaussing signal has a magnitude that is between 1 volt and 30 volts.

6. The measurement device of claim 1, wherein the AC degaussing signal has a frequency that is between 1 Hertz and 1,000 Hertz.

7. The measurement device of claim 1, wherein the circuitry is configured to generate the AC degaussing signal while receiving the magnetic field sensor signal from the magnetic field sensor representing the magnetic field induced in the magnetic core.

8. The measurement device of claim 1, wherein the magnetic field sensor comprises a Hall-effect sensor.

9. The measurement device of claim 1, wherein the magnetic field sensor comprises two or more Hall-effect sensors.

10. The measurement device of claim 1, wherein the circuitry is configured to determine the measurement of electric current flowing through the conductor based on the magnetic field sensor signal by averaging a plurality of measurements from the magnetic field sensor to account for jitter introduced by the AC degaussing signal.

11. A method comprising:
positioning a magnetic core around a conductor under test;
generating an alternating current (AC) degaussing signal in a winding that is wrapped around at least a portion of the magnetic core, the AC degaussing signal being independent of a current flowing through the conductor;
receiving a magnetic field sensor signal from a magnetic field sensor that is positioned adjacent the magnetic core, the magnetic field sensor signal representing a magnetic field induced in the magnetic core; and
determining a measurement of electric current flowing through the conductor based on the magnetic field sensor signal.

12. The method of claim 11, wherein positioning the magnetic core comprises positioning a flexible magnetic core around the conductor under test.

13. The method of claim 11, wherein generating the AC degaussing signal comprises generating an AC degaussing signal that has a fixed magnitude and a fixed frequency.

14. The method of claim 11, wherein generating the AC degaussing signal comprises generating an AC degaussing signal that has a magnitude that is between 1 volt and 30 volts and a frequency that is between 1 Hertz and 1,000 Hertz.

15. The method of claim 11, wherein generating the AC degaussing signal comprises generating an AC degaussing signal concurrently with the receiving of the magnetic field sensor signal from the magnetic field sensor representing the magnetic field induced in the magnetic core.

16. The method of claim 11, wherein determining the measurement of electric current comprises:
obtaining a plurality of measurements from the magnetic field sensor; and
smoothing the plurality of measurements to account for jitter introduced by the AC degaussing signal.

17. The method of claim 11, wherein generating the AC degaussing signal comprises generating a fixed magnitude AC voltage signal.

18. A non-transitory storage medium encoded with instructions or data, which, when executed by a processor, cause the processor to perform operations, the operations comprising:
generating an alternating current (AC) degaussing signal in a winding, the winding being wrapped around at least a portion of a magnetic core, and the AC degaussing signal being independent of a current flowing through a conductor under test;
receiving a magnetic field sensor signal from a magnetic field sensor positioned adjacent to the magnetic core, the magnetic field sensor signal representing a magnetic field induced in the magnetic core; and
determining a measurement of electric current flowing through the conductor based on the magnetic field sensor signal.

19. The non-transitory storage medium of claim 18, wherein generating the AC degaussing signal comprises generating a fixed frequency sine wave signal.

20. The non-transitory storage medium of claim 18, wherein generating the AC degaussing signal comprises generating a fixed magnitude AC voltage signal.

* * * * *